(12) United States Patent  (10) Patent No.: US 8,449,111 B2
Weatherby  (45) Date of Patent: May 28, 2013

(54) METHOD OF MAKING PRESCRIPTION LENS

(75) Inventor: Kenneth Allen Weatherby, Atlantic Beach, FL (US)

(73) Assignee: Polylite Taiwan Co., Ltd., Tao-Yuan County (TW)

( * ) Notice: Subject to any disclaimer, the term of this patent is extended or adjusted under 35 U.S.C. 154(b) by 87 days.

(21) Appl. No.: 13/284,386

(22) Filed: Oct. 28, 2011

(65) Prior Publication Data

US 2013/0107205 A1   May 2, 2013

(51) Int. Cl.
*G02C 7/02*   (2006.01)

(52) U.S. Cl.
USPC .................................... 351/159.75

(58) Field of Classification Search
CPC ............. G02C 7/02; G02C 7/024; G02C 7/027
USPC ................. 351/159.75, 159.76, 159.77, 178
See application file for complete search history.

(56) References Cited

U.S. PATENT DOCUMENTS

| | | | |
|---|---|---|---|
| 5,953,098 A | 9/1999 | Lieberman et al. | |
| 6,030,077 A | 2/2000 | Sawano et al. | |
| 6,334,681 B1 | 1/2002 | Perrott et al. | |
| 6,789,896 B2 | 9/2004 | Morris et al. | |
| 7,029,116 B2 | 4/2006 | Roscini | |
| 7,029,117 B2 | 4/2006 | Suzaki et al. | |
| 7,717,559 B2 | 5/2010 | Ito et al. | |
| 8,002,404 B2 | 8/2011 | Weatherby | |
| 2002/0060776 A1 | 5/2002 | Hodur et al. | |
| 2007/0159593 A1 | 7/2007 | Hibino et al. | |
| 2008/0231800 A1* | 9/2008 | Esser et al. ..................... 351/174 |
| 2010/0066974 A1 | 3/2010 | Croft et al. | |
| 2010/0079723 A1 | 4/2010 | Kingston et al. | |
| 2010/0149492 A1 | 6/2010 | Allione et al. | |
| 2013/0027659 A1* | 1/2013 | Shaw ....................... 351/159.41 |

FOREIGN PATENT DOCUMENTS

FR   2910645 B1   6/2008

* cited by examiner

*Primary Examiner* — Darryl J Collins
(74) *Attorney, Agent, or Firm* — Morris Manning & Martin LLP; Tim Tingkang Xia, Esq.

(57) ABSTRACT

In one aspect of the present invention, a method for manufacturing a prescription lens includes obtaining information of a prescription lens and a frame to accommodate the prescription lens, the information of the prescription lens comprising a lens power, an optical zone and a spherical front base curve, and the information of the frame comprises a frame curve; calculating the maximum lens thickness of the prescription lens at the optical zone according to the information of the prescription lens; selecting a lens according to the calculated maximum lens thickness at the optical zone, the information of the prescription lens and the frame; and processing the selected lens so as to obtain the prescription lens having an intermediate zone surrounding the optical zone and an edge zone surrounding the intermediate zone such that the thickness of the edge zone is substantially thinner than the maximum lens thickness of the optical zone.

17 Claims, 10 Drawing Sheets

METHOD OF MAKING PRESCRIPTION LENS

FIELD OF THE INVENTION

The present invention relates generally to a lens, and more particularly to a method of manufacturing a prescription lens.

BACKGROUND OF THE INVENTION

Lenses used in eyeglasses or spectacles for treating myopia, hyperopia, astigmatism and presbyopia of a wearer, or used in sunglasses or protective eyeglasses having wrap-around segments designed to shield the eye from incident light, wind and foreign objects in the temporal vision field of a wearer, have certain optical properties corresponding to a set of specifications as described in a prescription for the wearer.

Figure 9:
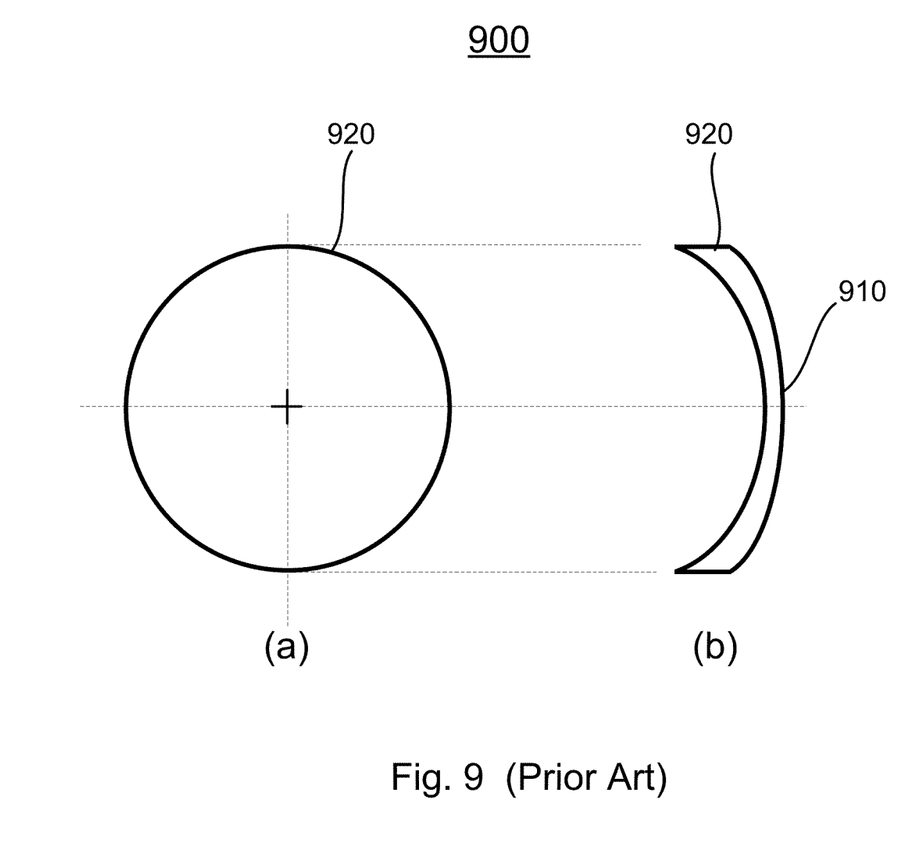
FIG. 9 shows schematically a traditional prescription lens, (a) a top view, and (b) a side view.

These lenses are usually prescribed to have a front curved lens surface designed to fit a curve profile of frames. As shown in FIG. 9, for a minus lens 900 with a front curved lens surface 910, the lens edge 920 is thicker than the other area of the lens 900. The larger the front base curve of a minus lens is, the thicker the lens edge of the minus lens is. For example, for a lens with a minus prescription of −4.00 sphere, if the lens has a front base curve of 2.00, the back surface curve of the lens would be of 6.00. If the lens has a front base curve of 4.00, the back surface curve of the lens would be of 8.00. The edge thickness of the lens with the front base curve of 4.00 is larger than that of the lens with the front base curve of 2.00. Traditionally, a wearer with a strong minus prescription needs a lens with a very thick edge. Therefore, traditionally the myopia wearer will use flatter ophthalmic frame base curve to reduce lens thick edge.

The large thickness at the edge of a lens may have a number of disadvantages such as obscuring wearer's views at wide angles, unappealing appearance, increasing the lens weight, and so on.

Additionally, conventional prescription lens is almost impossible to match with sunglass frame since most of sunglass frame use base curve 6 or 8, whereas conventional minus lens is using base curves between 2 and 4. For instance, for a minus lens of −4.00, its thickness will be extremely thick if the frame base curve is about 6.00 (so as to lens) and lens back side curve shall be cut at a base curve 10 regardless of solution of inadequate bevel matching attempt.

Therefore, a heretofore unaddressed need exists in the art to address the aforementioned deficiencies and inadequacies.

SUMMARY OF THE INVENTION

In one aspect, the present invention relates to a method for manufacturing a prescription lens. In one embodiment, the method includes the step of obtaining information of a prescription lens and information of a frame to accommodate the prescription lens, where the information of the prescription lens comprises a lens power, a central optical zone, an immediate zone, an edge zone and a spherical front base curve, and the information of the frame comprises a frame curve.

The method further includes the steps of calculating the size of the optical zone and maximum lens thickness of the prescription lens at the central optical zone according to the information of the prescription lens; selecting a lens according to the calculated maximum lens thickness at the optical zone, the information of the prescription lens and the information of the frame; and processing the selected lens so as to obtain the prescription lens having a spherical front lens surface with a front base curve configured to match a curve profile of the frame; and a rear lens surface curved such that the lens has a central optical zone, an annular intermediate zone surrounding the central optical zone, and an annular edge zone surrounding the intermediate zone, wherein the rear lens surface in the central optical zone has a curvature such that the central optical zone of the lens has a lens power substantially equal to a prescription for a wearer of the lens, the rear lens surface in the edge zone has a substantially flat profile in a direct substantially perpendicular to an optical axis of the prescription lens, and the rear lens surface in the intermediate zone has a curvature that smoothly bridges the curvature of the rear lens surface in the central optical zone and the flat profile of the rear lens surface in the edge zone, and wherein the lens has a substantially uniform edge thickness around a circumference of the lens, the edge thickness being thinner than a maximum thickness of the lens in the central optical zone. The spherical front base curve of the prescription lens matches the frame curve of the frame.

The prescription lens in one embodiment, has a geometric center and an optical center that is corresponding to the center of the optical zone of the prescription lens. In one embodiment, the optical center is substantially coincident with the geometric center.

In another embodiment, the optical center is substantially displaced from the geometric center.

In one embodiment, the prescription lens is a single vision lens. In another embodiment, the prescription lens is a progressive lens. Additionally, the prescription lens can be a plus lens or a minus lens.

In one embodiment, the selected lens is a finished lens. The processing step is performed by injection, casting and cutting the edge zone of the finished lens so that the thickness of the edge zone is substantially constant and thinner than the maximum lens thickness of the optical zone.

In another embodiment, the selected lens is a semi-finished lens. The processing step is performed by cutting a predetermined area of the semi-finished lens to form the optical zone therein and cutting the edge zone of the semi-finished lens so that the thickness of the edge zone is constant and substantially thinner than the maximum lens thickness of the optical zone.

In one embodiment, the method further includes the step of compensating the prescription, before the calculating step is performed. The compensating step comprises at least one of the following steps: (a) determining at least one of a frame angle, a pantoscopic tilt, an optical center height and a distance above the bottom most portion of the frame; (b) determining a lens angle of the prescription lens with a combination of the determined frame angle, a pupil distance and a lens front curve of the prescription; (c) compensating an axis based on the lens angle of the prescription lens; (d) determining changes in sphere and cylinder power necessary due to the wrap angle; (e) determining the angle needed to cylinder, and the changes needed to the sphere and cylinder powers so that the wearer experiences the same sphere and cylinder as prescribed; (f) compensating the pupil distance so that the optical center is located directly in the line of site of the wearer; and (g) calculating the actual lens surface of the prescription lens.

In one embodiment, the calculating step comprises the steps of determining the lens edge thickness and the lens edge thinness by the compensated prescription rear surface and resulting the maximum lens thickness of the optical area; and determining the intermediate zone and the edge zone.

In one embodiment, the maximum lens thickness is equal to the sphere power. In another embodiment, the maximum lens thickness is equal to the sum of the sphere power and the cylinder power.

The prescription lens in one embodiment is formed of glass or plastic.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, wherein.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present invention in conjunction with the accompanying drawings in FIGS. 1-8. In accordance with the purposes of this invention, as embodied and broadly described herein, this invention, in one aspect, relates to a prescription lens and a method for manufacturing same.

Figure 1:
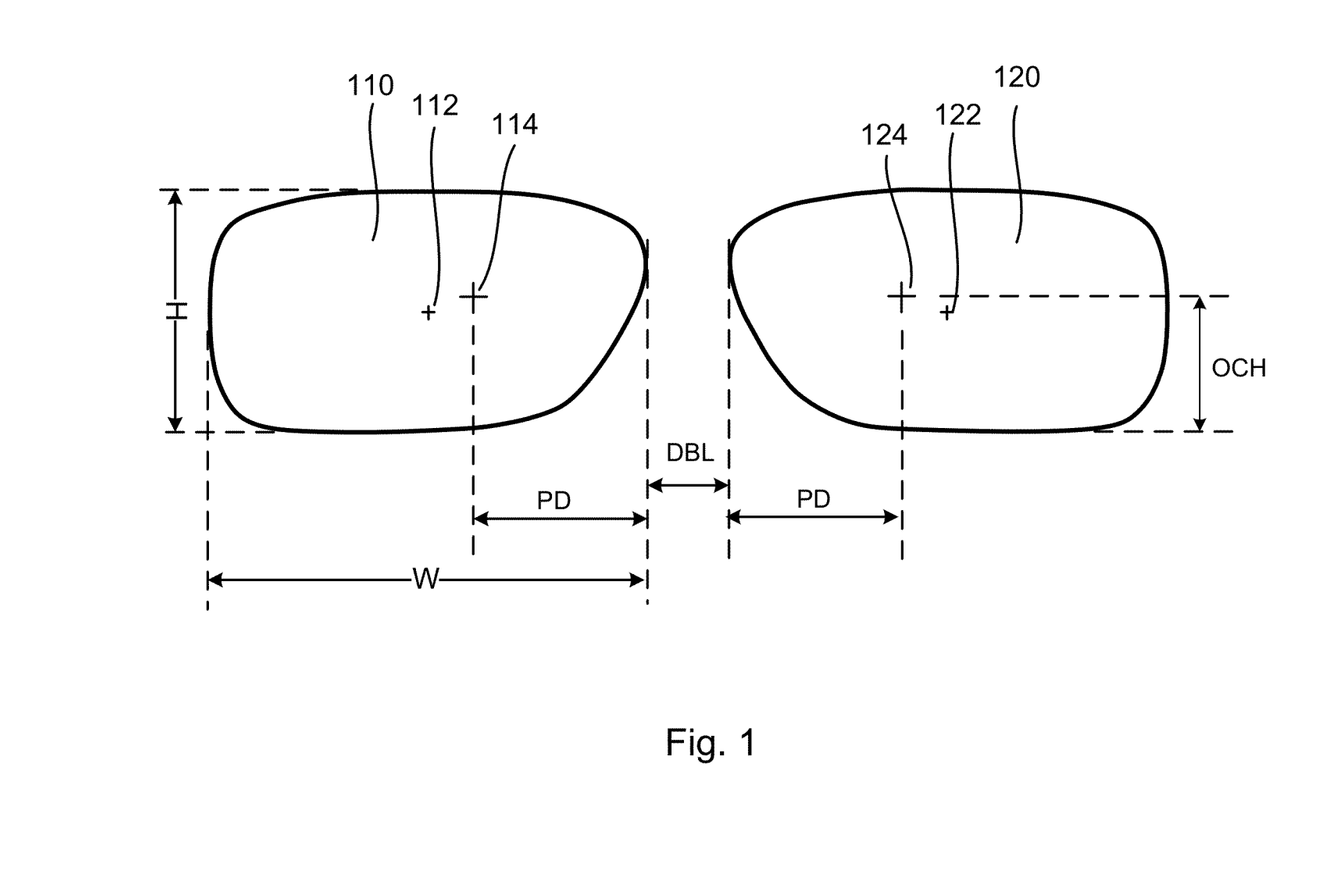
FIG. 1 shows schematically a pair of glasses with prescribed parameters.

FIG. 1 illustrates schematically lenses 110 and 120 used in a pair of eyeglasses with the prescription information of the lenses 110 and 120 (a set of specifications) as described in a prescription for a wearer. The prescription information includes a size of the lenses 110 and 120 including a height, H, and a width, W, a pupillary distance (PD) that is the distance (usually measured in millimeters) between the center 114 (124) of the pupil in an eye and the inner edge of the lens 110 (120), a distance between the lenses (DBL) that is distance between the inner edges of the lens 110 (120), and optical center height (OCH). The size of the lenses 110 and 120 is adapted for fitting an eyeglass frame, and used to select proper lens blanks to produce the lenses 110 and 120. The size information defines the geometric center 112 (122) of the lens 110 (120). Additionally, the pupillary distance (PD) defines the optical center 114 (124) of the lens 110 (120). The prescription information also includes a lens power, a front base curve, sphere power, cylinder power, axis, distance vision (DV), near vision (NV), and so on, for each lens 110 or 120.

Figure 2:
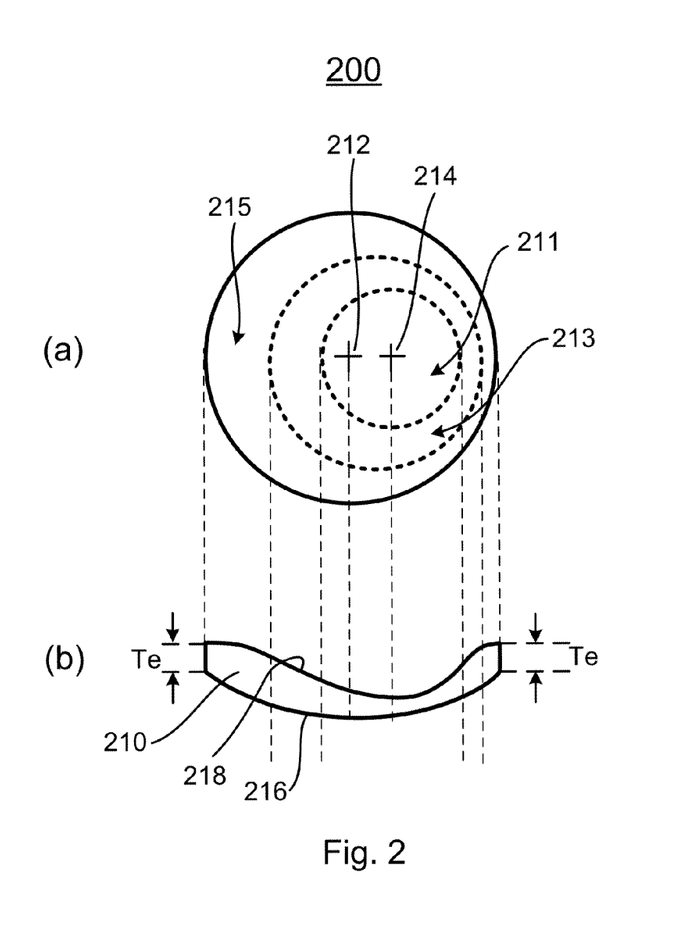
FIG. 2 shows schematically a prescription lens according to one embodiment of the present invention, (a) a top view, and (b) a side view.
Figure 5:
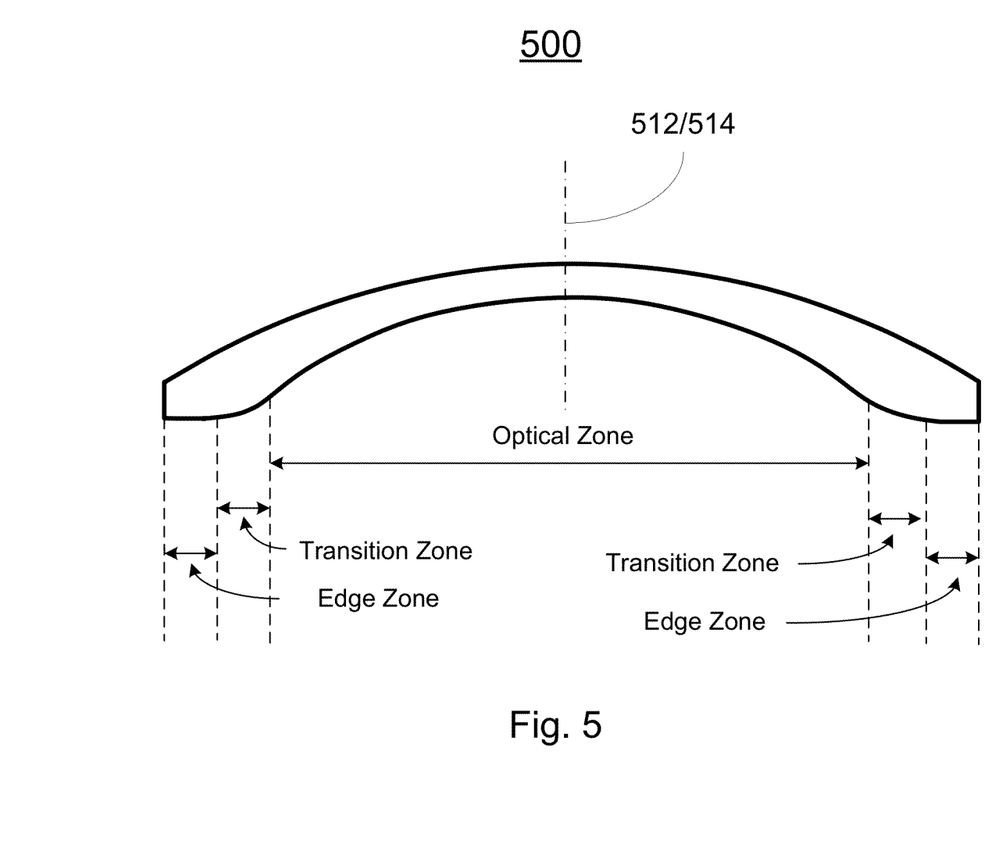
FIG. 5 shows schematically a prescription lens according to another embodiment of the present invention.
Figure 7:
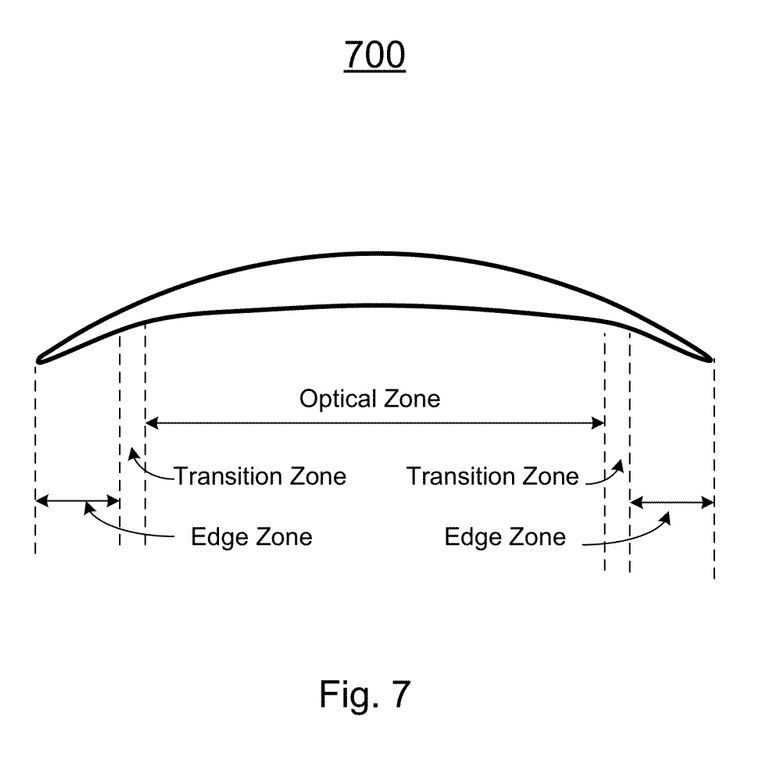
FIG. 7 shows schematically a prescription lens according to a further embodiment of the present invention.

Referring to FIG. 2, a prescription minus lens 200 with a top view (a) and a side view (b) is schematically shown according to one embodiment of the present invention. The prescription lens 200 fitted for an eyeglass frame has a spherical front lens surface 216 with a front base curve configured to match a curve profile of the frame, a rear lens surface 218 curved such that the lens 200 has a central optical zone 211, an annular intermediate zone 213 surrounding the central optical zone 211, and an annular edge zone 215 surrounding the intermediate zone 213, and a lens body 210 defined between the spherical front lens surface 216 and the rear lens surface 218. The rear lens surface 218 in the central optical zone 211 has a curvature such that the central optical zone 211 of the lens 210 has a lens power substantially equal to a prescription for a wearer of the lens 210. The rear lens surface 218 in the edge zone 215 has a substantially flat profile in a direct substantially perpendicular to an optical axis of the prescription lens 200. The rear lens surface 218 in the intermediate zone 213 has a curvature that smoothly bridges the curvature of the rear lens surface 218 in the central optical zone 211 and the flat profile of the rear lens surface 218 in the edge zone 215. The optical area is adapted for providing a lens power according to a prescription of a lens for a wearer. The thickness Te of the edge zone 215 is substantially constant and thinner than the maximum lens thickness of the optical area 211. The lens body 210 has a geometric center 212 and an optical center 214 that is corresponding to the center of the optical area 211. The optical center 214 is substantially displaced from the geometric center 212. The optical center can also substantially be coincident with the geometric center, as shown in FIGS. 5 and 7.

The spherical front lens surface 216 is configured to match the frame curve of a frame. The rear lens surface 218 at the optical area 211 of the lens body 210 is configured such that the lens body 210 at the optical area 211 corresponds to a single vision lens. In one embodiment, the rear lens surface at the optical area of the lens body is configured such that the lens body at the optical area corresponds to a progressive lens.

Figure 6:
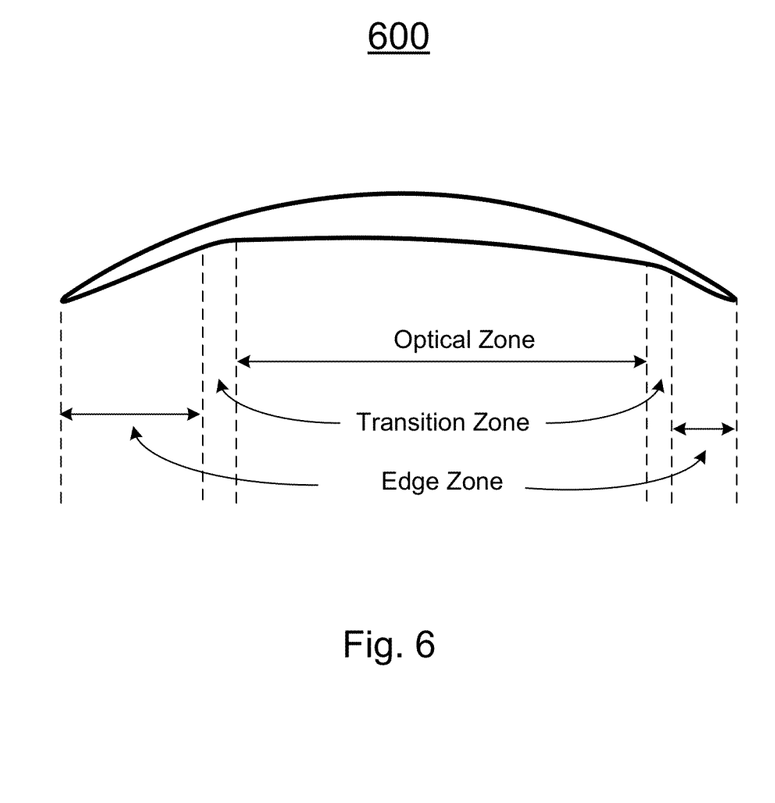
FIG. 6 shows schematically a prescription lens according to yet another embodiment of the present invention.

Additionally, the rear lens surface 218 at the optical area 211 of the lens body 210 is configured such that the lens body 210 at the optical area 211 corresponds to a minus lens. In one embodiment, the rear lens surface at the optical area of the lens body is configured such that the lens body at the optical area corresponds to a plus lens, as shown in FIGS. 6 and 7.

The prescription lens 200 in one embodiment is formed of a transparent material such as glass or plastic.

According to the invention, the prescription lens 200 is manufactured by the following steps: at first, the information of a prescription lens and information of a frame to accommodate the prescription lens are acquired, where the information of the prescription lens comprises at least a lens power, an optical area and a spherical front base curve and other information described above. The information of the frame comprises a frame curve that is characterized with an angle and tilt of the frame. The spherical front base curve of the prescription lens is adapted for matching the frame curve of the frame. The frame angle, which is up to 24 degrees for a wrap around type sunglass, is measured. Additionally, the pantoscopic tilt of the frame in degrees is also measured or estimated at the time of performing the lens calculations. The information of the optical center height (OCH) or the distance above the bottom most portion of the frame is also needed.

Then with a combination of the pupil distance, the frame angle and the lens front curve selected, the lens angle is determined, which varies with each frame. Once the lens angle is known, then a compensation for the axis can be made.

The changes in sphere and cylinder power necessary due to the wrap angle are determined. The angle needed to cylinder, and the changes needed to the sphere and cylinder powers are determined so that the wearer experiences the same sphere and cylinder as prescribed. The pupil distance (PD) is also compensated so that the optical center is located directly in the line of site of the wearer. The actual lens surface is calculated to take all of these calculations into account.

Then, the lens thickness of the prescription lens at the optical zone is calculated according to the information of the prescription lens. The calculating step in one embodiment is performed with lens design software developed by Advanced Lens Technologies, LLC. The software is specifically designed to manage the wearer's prescription and the frame information, the lens blank selection which enables the creation of personalized lenses for the customer. In one embodiment, the lens edge thickness and edge thinness are determined by the compensated prescription rear surface and resulting thickness of the optical area before determining the optical zone, intermediate zone and outer zone.

One of the advantages of the present invention is to determine the maximum thickness desired by a combination or individual value based on the prescription. For example: the maximum lens thickness for a −4.00 sphere with −0.75 cylinder at 80 degrees can be calculated based on the following formula: the maximum lens thickness=sphere power only, or the maximum lens thickness=(sphere power+cylinder power). The optical zone is selected, based on an optical zone diameter or other shape that are predetermined. This is then used as the maximum lens thickness at the edge of the selected optical zone in a minus lens. The lens thickness is set for sphere+cylinder=maximum thickness of 5 mm for example. Then, the maximum size of the optical zone is calculated.

Once the maximum size of the optical zone is known, the intermediate zone and the edge zone are then calculated. The intermediate zone is either predetermined with a size of, e.g., 5 mm, or is varied based on various thickness lenses and desired cosmetic appearance.

Figure 8A:
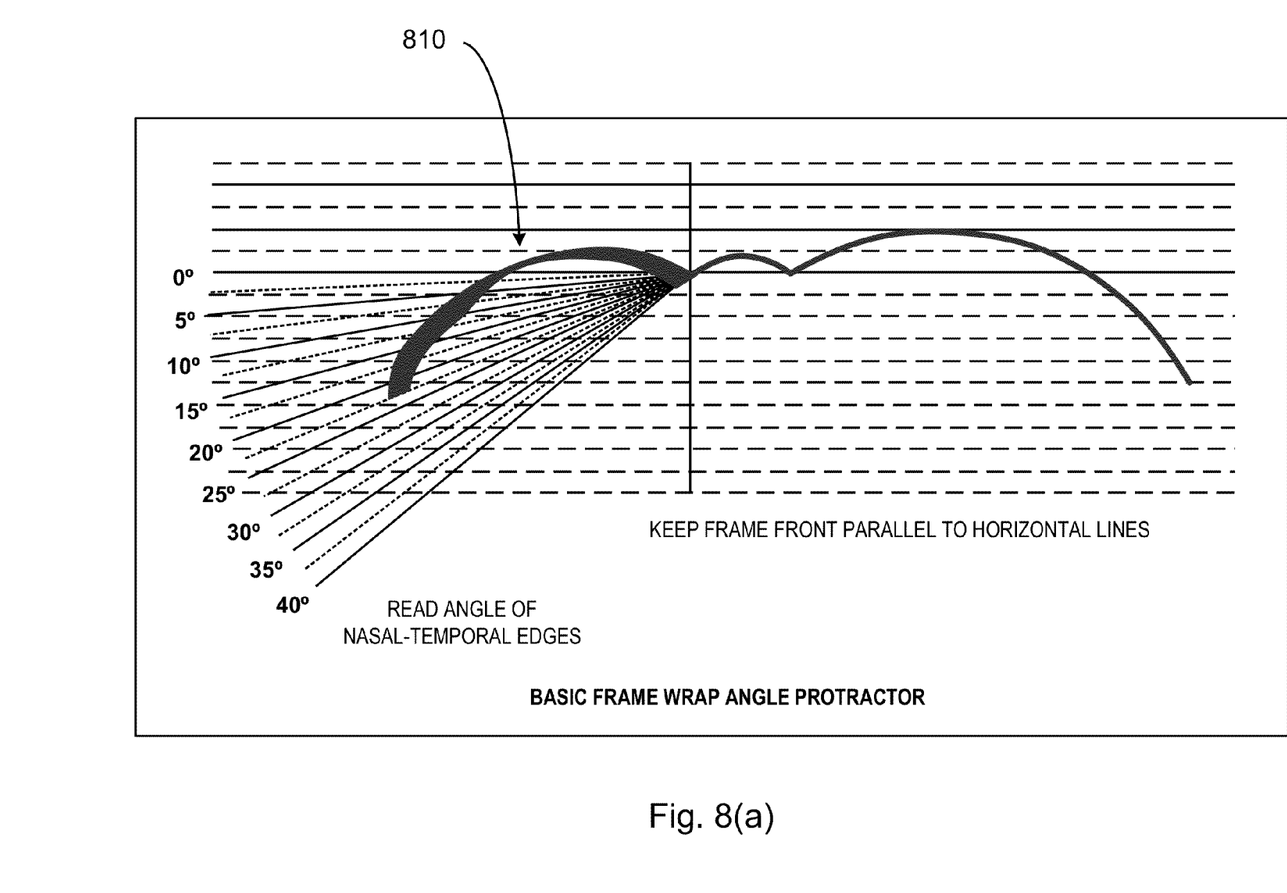
FIG. 8(a) shows schematically a top view of a prescribed minus lens according to one embodiment of the present invention, showing how the 22 degree wrap angle is determined.
Figure 8B:
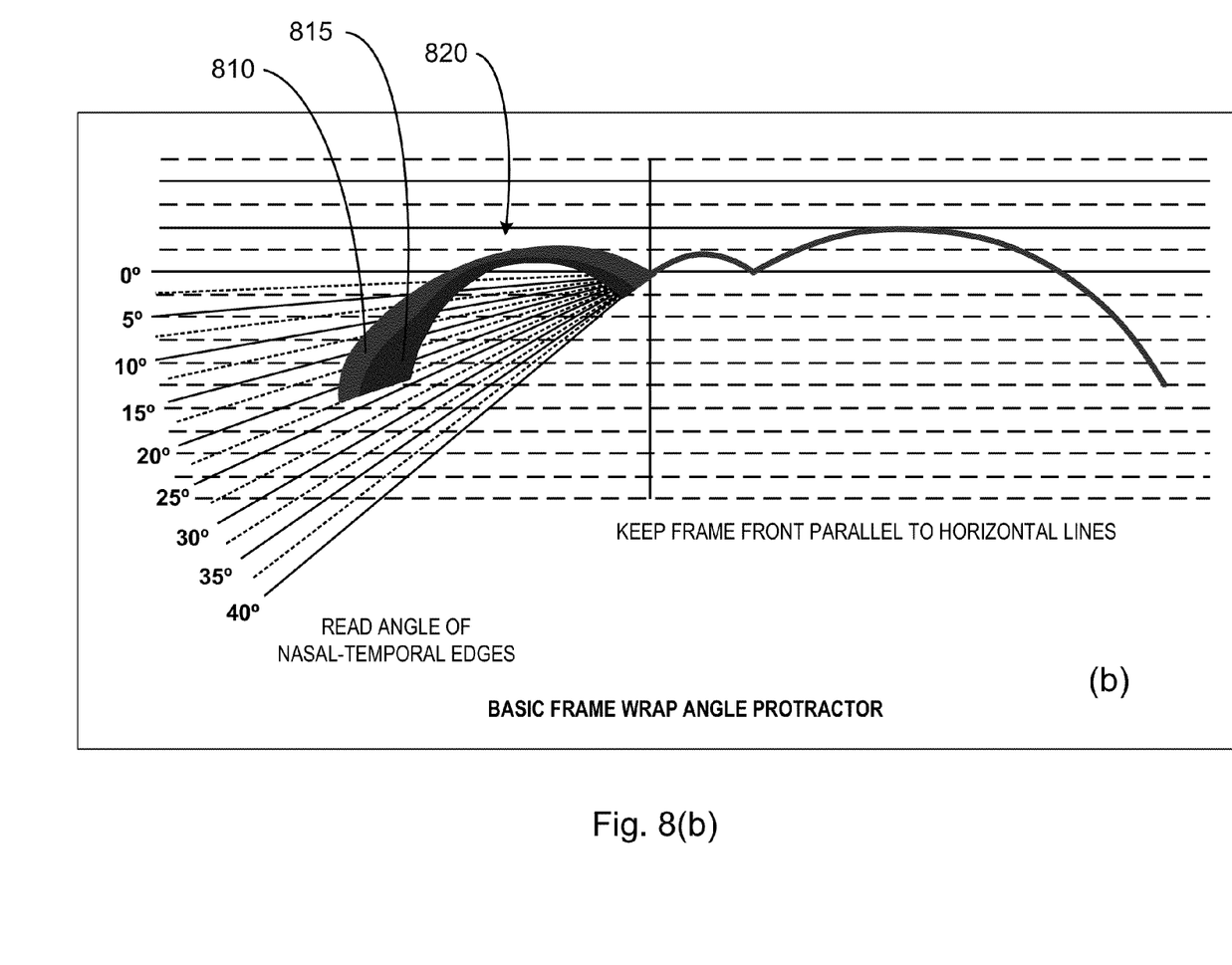
FIG. 8(b) shows schematically a top view of a traditional minus lens.

FIG. 8(a) shows a top view of a prescribed minus lens 810 according to one embodiment of the present invention, showing how the wrap angle of about 22 degrees is determined. FIG. 8(b) shows a top view of a traditional minus lens 820 where, as a comparison, the profile of the prescribed minus lens 810 is outlined. It is clearly shown that the edge thickness of the prescribed minus lens 810 is much thinner than that of the traditional minus lens 820 that includes an extra portion 815 in addition to the prescribed minus lens 810.

Figure 3:
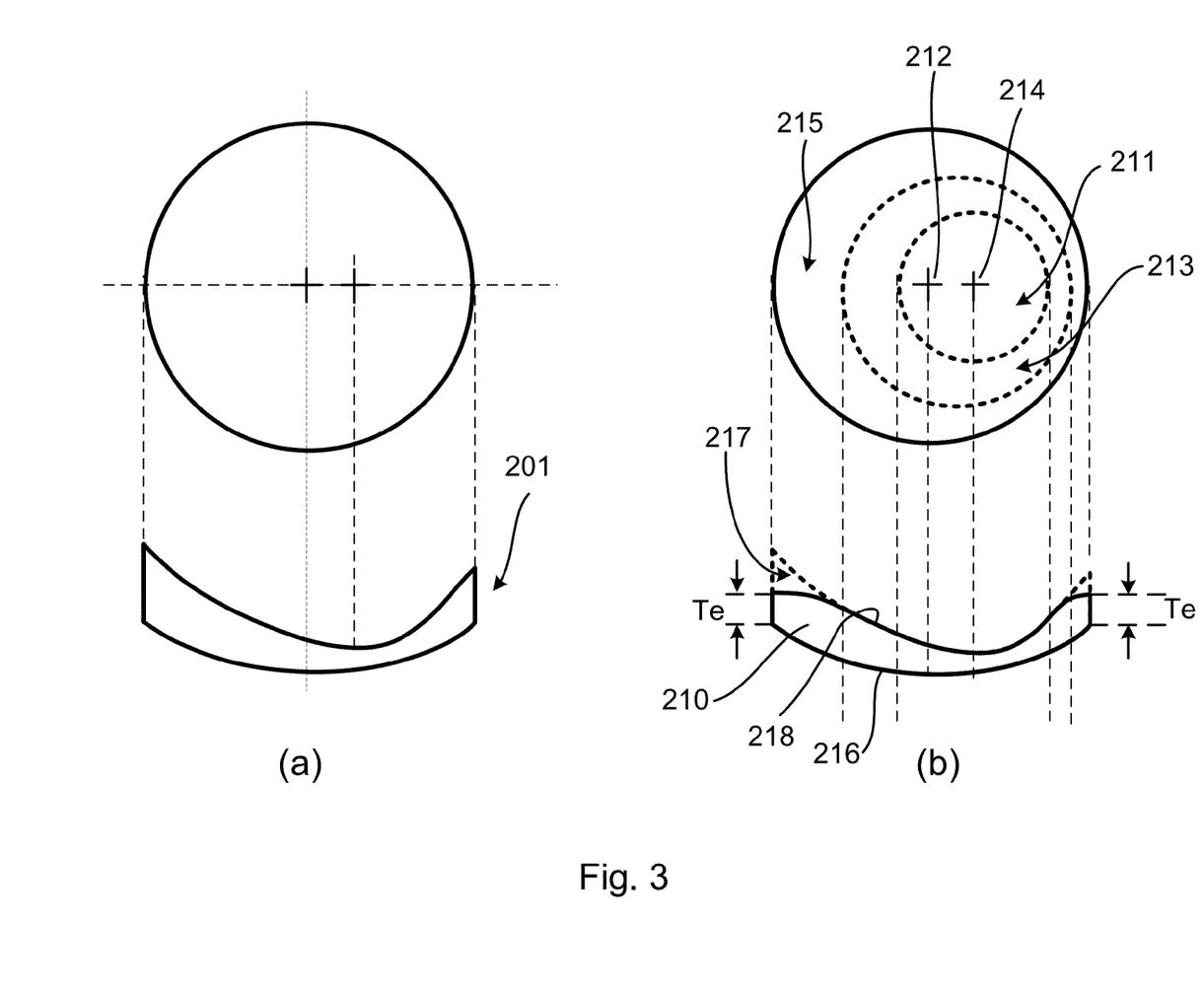
FIG. 3 shows schematically (a) a lens blank, and (b) a prescription lens produced from the lens blank according to one embodiment of the present invention.
Figure 4:
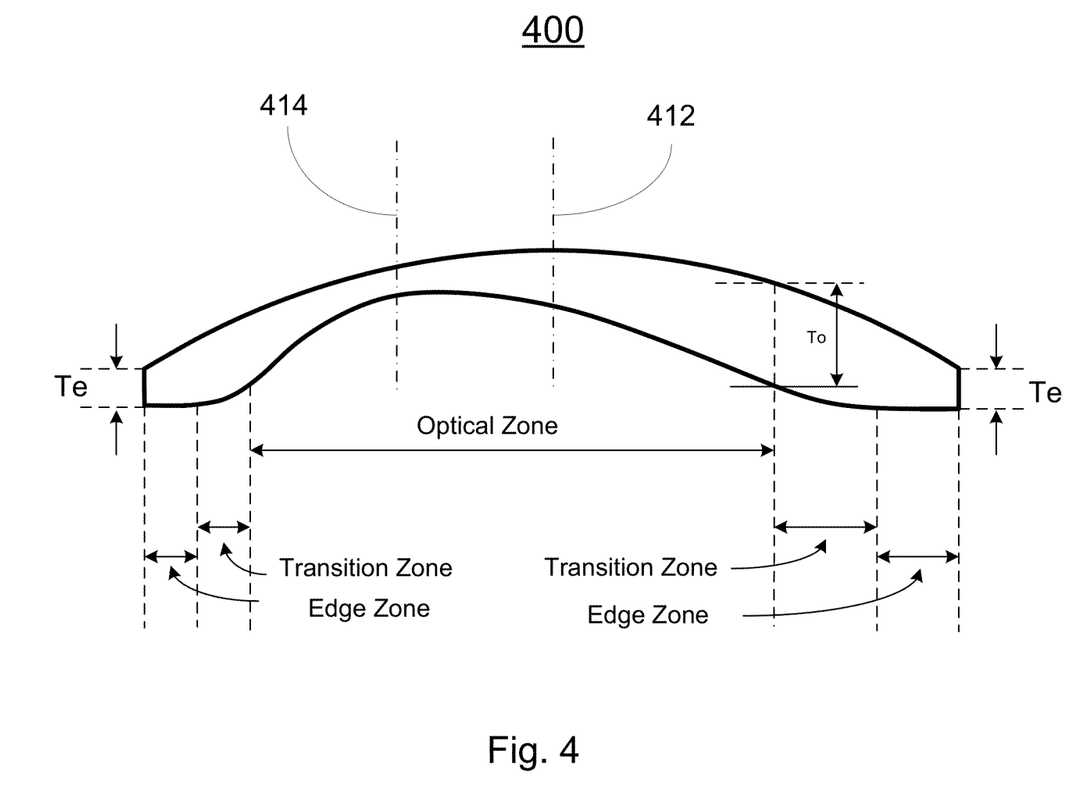
FIG. 4 shows schematically a prescription lens according to one embodiment of the present invention.

Based on the calculated maximum lens thickness at the optical zone, the information of the prescription lens and the information of the frame, a lens blank 201 is selected, as shown in FIG. 3(a).

The selected lens is then processed to obtain the prescription lens 200 that has an annular intermediate zone 213 surrounding the optical area 211 and an annular edge zone 215 surrounding the intermediate zone 213 such that the thickness Te of the annular edge zone 215 is substantially thinner than the maximum lens thickness of the optical area 211.

The selected lens can be a finished lens or a semi-finished lens. For a finished lens, as shown in FIG. 3(a), the processing step is performed by injection, casting and cutting the edge zone 217 of the finished lens so that the thickness of the edge zone is substantially constant and thinner than the maximum lens thickness of the optical zone. According to the present invention, for a finished lens with blend zone and outer zone, the backside mold for the finished lens is much different from the traditional backside mold for the finished lens. This invention allows for stronger minus and plus powered lenses to be made with an optical zone, and an intermediate zone, plus an edge zone. The traditional injected or cast lens is made with a backside mold that is made to include the prescription powers only with no accommodation for a intermediate zone or edge zones.

For a semi-finished lens, the processing step is performed by cutting a predetermined area of the semi-finished lens to form the optical zone therein and cutting the edge zone of the semi-finished lens so that the thickness of the edge zone is constant and substantially thinner than the maximum lens thickness of the optical zone.

According to one embodiment of the invention, this production optimization starts with selecting a blank from a number of different blanks with different radius front curves, which will be lenses of different diameters and thicknesses. In one embodiment, these blanks are selected based on the most popular front curves and then optimize cutting times by offering different lens blank choices. The correct selection is made based on the size of the lens design area needed and the maximum finished thickness calculated. The basic concept for the automatic lens selection is once the finished lens surface and the diameter are calculated then the correct lens blank can be selected.

An additional option to optimize the production is the use of different rear curves for the same front curve. As an example a 6 base front curve may be made in semi-finished with both a 6 base back curve in two thicknesses. One thickness may be 4 mm center and 4 mm edge. The other may be 8 mm center and 8 mm edge.

An alternate version of the 6 base front curve could be using a 2 base back curve having a 6 mm center with a 3 mm edge thickness for a plus lens. For a minus lens the 6 base front curve could have a 3 mm center thickness with a 6 mm edge thickness.

With these various choices listed above for the same front lens curve, one can have the software select the lens blank that provides enough material to surface the lens with the lease amount of wasted or cut away material.

According to one embodiment of the present invention, a process of manufacturing a prescription sunglass lens using a spherical front lens surface manufactured to offer a best fit for the sunglass frame is provided. This invention is not limited to sunglass lenses and is intended to cover any prescription lens used with the matching front base curve and the frame curve. According to the present invention, the prescriptions are compensated using the proper front lens base curve and the matching frame curve, However, the traditional methods of producing these prescription lenses do not compensate the prescription of the curvature of the wrap or tilt of the sunglass frame. This invention in one aspect relates to at least single vision finished lenses and methods of making same.

The invention in one aspect offers cosmetic benefits as well as increased optical correctness. According to this invention, a combination of best appearing and fitting of a prescription lens is achieved. When viewed from the front, the prescription sunglass lens that fits in the frame according to the invention looks like a non-prescription lens. When viewed from the backside, the lens is produced to be thinner than a lens produced using traditional lens production methods currently used to produce the majority of prescription lenses.

In one embodiment, a prescription sunglass lens is currently produced based on the prescription. Once the prescription is known, a front spherical curve lens is recommended. Then the calculation for making the required prescription is determined. Production of the lens is then able to begin. The stronger the minus prescription lens is, the flatter the front base curve of the lens is recommended.

For example, a strong minus prescription of −4.00 sphere would traditionally recommend a front base curve of 2.00 to 4.00. To produce this for a lens with a base curve of 2.00, one would have to have a back surface curve of 6.00. With a front curve of 4.00, one would need a back curve of −8.00 to produce a −4.00 prescription. Both of these exemplary lenses are now cut to fit the frame. Almost all sunglass frames are designed for a 6 base front curve lens or an 8 base front curve lens, (a few more recent frame designs require a 9 base front curve lens). To fit an incorrect front curve to a 6 or 8 base curve frame, the lens will have a portion that does not fit exactly to the spherical front surface but rather to a bevel that has been applied to the prescription lens to allow it to be placed in a frame that the front curve was not designed for.

One of the solutions according to the invention is to produce a prescription lens to fit the frame curve with an almost perfect fit. To do this, a lens form to produce the prescription lens that allows the wearer to see clearly is calculated by taking into account data currently not considered for the production of a sunglass prescription lens.

A limited number of optical professionals producing a prescription lens have changed the prescriptions to take into account the frame wrap and pantoscopic tilt. This makes the wearer able to see as if the wearer is looking through traditional prescription lenses made to fit flat to the face. The difference that this invention offers over the changes to wrap and tilt is that with this invented process of making a sunglass lens, the lens prescription is adjusted for proper vision in the as worn position, and the front base curve is matched to the frame.

According to one embodiment of this invention, a prescription lens is made such that when viewed from the front as if looking at the wearer, it does not look any different than a non-prescription lens. The optics of the lens is also modified by this invention to make the prescription work properly with the fit of the frame and the non-traditional front base curve that is used.

According to the invention, one can produce better fitting and better cosmetic looking lenses in both plus and minus powers. This benefit is produced by developing a lens that works for the wearer's prescription based on the frame angle and tilt without considering the wearer's actual frame shape. The optical area of this lens may not extend to all parts of the frame. To accomplish producing a lens that the wearer can see out of, and one that fits the frame, one must create areas of the lens that make the lens fit and keep the prescription lens as thin as possible for the area of vision one have chosen to use.

In one embodiment, the optical center and the geometric center are not located in the middle of the lens. The geometric center is the center of the circular lens, while the optical center is located about 4 to 10 mm from the geometric center. This allows the lens to cover the frame and place the optical center in the front of the wearer's eye.

A significant aspect of this invention is the calculation of the thinnest lens that still gives the wearer an excellent area of the lens that is optically correct for the prescription. To calculate the optimized lens, first, the wearer prescription information is required. Also the frame information is needed. A trace of the frame or other method to acquire the frame shape is needed. Depending on the prescription a different target lens thickness is developed. As an example: A lens with a −5.00 sphere with an 8 base curve frame results in a thick edged lens. The prescription lens is then calculated after it is optimized for lens and the frame information including the frame angle and frame tilt. If the desired maximum lens thickness is about 4.5 mm, then an optical zone is described by the software where the maximum lens thickness is 4.5 mm. Any area outside this thickness that is greater than 4.5 mm would become a non-optically correct area and only be used to develop additional lens material needed to properly fit the frame so that the end result is a cosmetic design that has a good usable optical area yet looks like a non-prescription lens when worn by the wearer.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for manufacturing a prescription lens fitted for an eyeglass frame, comprising the steps of:

(a) obtaining information of a prescription lens from a prescription and information of a frame to accommodate the prescription lens, wherein the information of the prescription lens comprises a lens power, an optical zone and a spherical front base curve, and wherein the information of the frame comprises a frame curve characterized with an angle and tilt of the frame;

(b) calculating an optimum size of the optical zone as well as the maximum lens thickness of the prescription lens at the optical zone according to the information of the prescription lens and the information of the frame;

(c) selecting a lens according to the calculated maximum lens thickness at the optical zone, the information of the prescription lens and the information of the frame; and (d) processing the selected lens so as to obtain the prescription lens having:

a spherical front lens surface with a front base curve configured to match a curve profile of the frame; and a rear lens surface curved such that the lens has a central optical zone, an annular intermediate zone surrounding the central optical zone, and an annular edge zone surrounding the intermediate zone, wherein the rear lens surface in the central optical zone has a curvature such that the central optical zone of the lens has a lens power substantially equal to a prescribed lens power for a wearer of the lens, the rear lens surface in the edge zone has a substantially flat profile in a direct substantially perpendicular to an optical axis of the lens, and the rear lens surface in the intermediate zone has a curvature that smoothly bridges the curvature of the rear lens surface in the central optical zone and the flat profile of the rear lens surface in the edge zone, and wherein the lens has a substantially uniform edge thickness around a circumference of the lens, the edge thickness being thinner than a maximum thickness of the lens in the central optical zone.

2. The method of claim 1, further comprising the step of compensating the prescription, before the calculating step is performed.

3. The method of claim 2, wherein the compensating step comprises at least one of the following steps:

(a) determining at least one of a frame angle, a pantoscopic tilt, an optical center height and a distance above the bottom most portion of the frame;

(b) determining a lens angle of the prescription lens with a combination of the determined frame angle, a pupil distance and a lens front curve of the prescription;

(c) compensating an axis based on the lens angle of the prescription lens;

(d) determining changes in sphere and cylinder power necessary due to the wrap angle;

(e) determining the angle needed to cylinder, and the changes needed to the sphere and cylinder powers so that the wearer experiences the same sphere and cylinder as prescribed;

(f) compensating the pupil distance so that the optical center is located directly in the line of site of the wearer; and (g) calculating the actual lens surface of the prescription lens.

4. The method of claim 3, wherein the calculating step comprises the steps of:

(a) determining the lens edge thickness and the lens edge thinness by the compensated prescription rear surface and resulting the maximum lens thickness of the optical area; and (b) determining the intermediate zone and the edge zone.

5. The method of claim 4, wherein the maximum lens thickness of the optical zone is equal to the sphere power.

6. The method of claim 4, wherein the maximum lens thickness is equal to the sum of the sphere power and the cylinder power.

7. The method of claim 1, wherein the selected lens is a finished lens.

8. The method of claim 7, wherein the processing step is performed by injection, casting and cutting the edge zone of the finished lens so that the thickness of the edge zone is substantially constant and thinner than the maximum lens thickness of the optical zone.

9. The method of claim 1, wherein the selected lens is a semi-finished lens.

10. The method of claim 9, wherein the processing step is performed by cutting a predetermined area of the semi-finished lens to form the optical zone therein and cutting the edge zone of the semi-finished lens so that the thickness of the edge zone is constant and substantially thinner than the maximum lens thickness of the optical zone.

11. The method of claim 1, wherein the spherical front base curve of the prescription lens matches the frame curve profile of the frame.

12. The method of claim 1, wherein the prescription lens has a geometric center and an optical center that is corresponding to the center of the optical area of the prescription lens.

13. The method of claim 12, wherein the optical center is substantially coincident with the geometric center, or substantially displaced from the geometric center.

14. The method of claim 12, wherein the prescription lens is a single vision lens.

15. The method of claim 13, wherein the prescription lens is a multifocal lens including a progressive lens or a bifocal lens.

16. The method of claim 12, wherein the prescription lens is one of a plus lens and a minus lens.

17. The method of claim 1, wherein the prescription lens is formed of glass or plastic.

* * * * *